June 21, 1927.  1,632,880
E. R. BURTNETT
INLET MANIFOLD FOR INTERNAL COMBUSTION ENGINES
Filed July 31, 1924
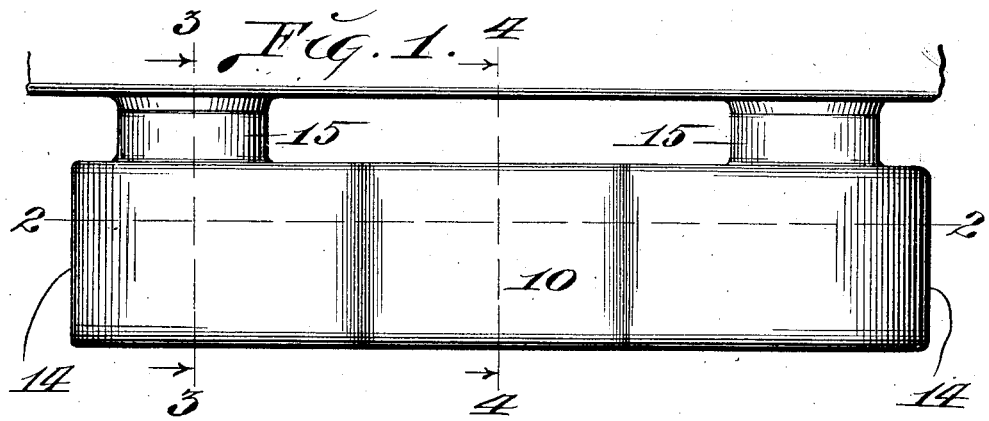
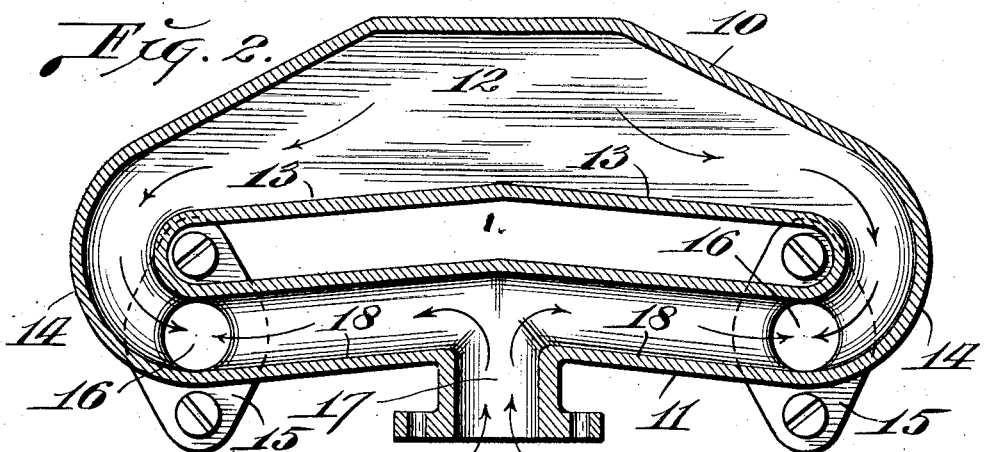
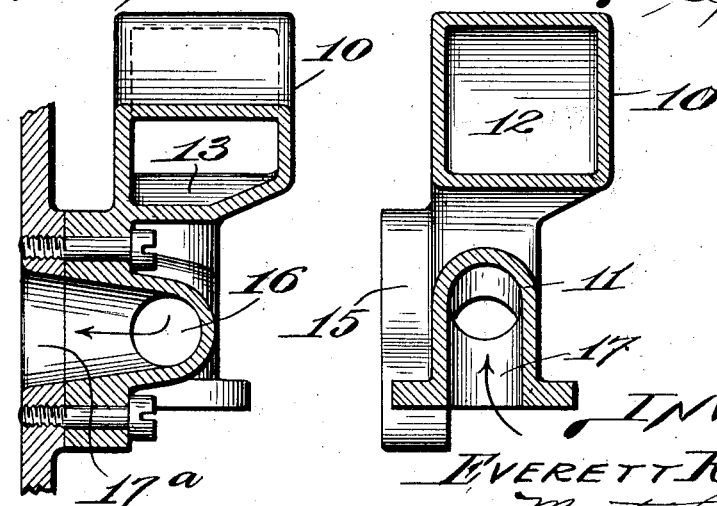
INVENTOR,
Everett R. Burtnett.
By Martin O. Smith, Atty.

Patented June 21, 1927.

1,632,880

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INLET MANIFOLD FOR INTERNAL-COMBUSTION ENGINES.

Application filed July 31, 1924. Serial No. 729,299.

My invention relates generally to internal combustion engines and more particularly to the gaseous fuel inlet manifolds therefor, the principal object of my invention being to provide a gaseous fuel inlet manifold for two stroke cycle internal combustion engines of the type in which, no inlet valves are used for controlling the admission of gaseous fuel to the precompression chamber and in which, the gaseous fuel charge is admitted to the precompression chamber during the relatively short period of time that the piston of said precompression chamber is passing outer dead center, and said fuel charge being admitted through ports uncovered by the piston at such time.

It has been found by experiment and practice, with an engine embodying two units of the two stroke cycle principle wherein one revolution, or 360°, completes the cycle, and with the admission of the fuel charge taking place during the time the precompression piston passes over outer dead center, that this function occupies a total time of approximately 90°. As there are only two of these admission periods, it necessarily follows that in an engine of two units, during each 360° shaft rotation, each complete period of 90° duration, with alternate and successive 90° non-admission periods between each of the 90° admission periods, causes, where a conventional manifold is used, a very great fluctuation of pressure within said manifold and necessitates the use of a carbureter having too great a volume capacity and a manifold without the necessary restriction to provide sufficient charge velocity to develop maximum power and fuel economy in engine operation.

Therefore, it is an object of my invention, to provide an inlet manifold with an outlet to each precompression unit and an inlet from the carbureter or mixing means. In order that the velocity be as high as possible, the passsageways or ducts between the inlet and outlets of the manifold are made comparatively small, so as to provide a volume compatible with the displacement of the precompression chamber in the manifold, so that, during the short period of 90° in which the chamber must fill, I have formed a continuous passage manifold, in which the part joining the two outlets and out of the path of direct circulation between the inlet and outlets is relatively large in cross section.

A further object of my invention is, to form the manifold so that there will be no liquid traps in the passageways, the gravity drain surfaces extending each way from the inlet opening to the manifold, to each outlet opening therefrom, and gravity drain surfaces extending from the center of the non-inlet passage that connects the two outlets in both directions from center to said manifold outlets.

With the foregoing and other objects in view, my invention consists in the features of construction and combination and arrangement of parts hereinafter more fully described and claimed, reference being had to the accompanying drawings, in which Figure 1 is a top plan view of a gaseous fuel inlet manifold of my improved construction;

Figure 2 is a vertical section taken on the line 2—2 of Figure 1;

Figure 3 is a vertical cross section taken approximately on the line 3—3 of Figure 1;

Figure 4 is a vertical cross section taken approximately on the line 4—4 of Figure 1.

My improved inlet manifold is preferably cast in a single piece, and it comprises an upper member 10 and a lower member 11, which members are hollow so as to provide a practically continuous chamber.

The central portion of the upper member 10 is relatively large in cross section so as to provide a central chamber 12 of considerable area. From the housing that surrounds this relatively large central chamber, the walls of member 10 gradually decline in opposite directions toward the ends of the casting, and thus oppositely arranged declining drain surfaces 13 are formed on the bottom walls of the end portions of the housing, which drain surfaces start from the center of the housing 10 and gradually decline in both directions therefrom.

The ends of upper hollow member 10 unite directly with downwardly and inwardly curved hollow end members 14 and formed integral with the rear portions of the lower ends of these members 14 are rearwardly projecting lugs 15 that are adapted to be rigidly fixed in any suitable manner directly to the cylinder block of an engine. These lugs 15 are provided with horizontally disposed gaseous fuel inlet ducts 16 that communicate directly with the inlet ducts 17ª into the combustion chambers of the engine and the lower ends of the chambers and the curved end members 14 communicate directly with said inlet ducts 16.

Hollow member 11 is arranged below member 10 and between the lugs 15, and the ends of said hollow member 11 connect directly with the lower ends of the curved end members 14. The volumetric capacity of hollow member 11 is substantially less than that of hollow member 10, and throughout its length the cross sectional area of said hollow member is less than the cross sectional dimensions of said upper member 10. A flanged opening 17 is formed at the center of member 11 for the admission of gaseous fuel from a carbureter or like source of supply, and from this gaseous fuel inlet the bottom surfaces of the chamber through member 11 decline in opposite directions toward the gaseous fuel inlet opening 16, thereby providing drain surfaces 18 that correspond with the drain surfaces 13 in upper member 10.

Thus it will be seen that I have provided a relatively simple and practical inlet manifold having an outlet to each precompression unit of the engine and with a single gaseous fuel inlet from the carbureter or other source of gaseous fuel supply and which inlet is located at a central point between the outlets, and, further, that there is a relatively large chamber between the gaseous fuel outlets. As a result of this arrangement, the sudden demand developed by the suction stroke of one of the pistons within the engine on the gaseous fuel volume within the manifold will not cause an extraordinary or abnormal fluctuation of velocity and pressure on the carbureter, which result is brought about by the large area within the manifold and the provision of the continuous chamber therein. As a result, the carbureter may be restricted so as to provide proper velocity and the desirable and advantageous steady column movement, which latter materially assists in uniform metering of the fuel with the air.

While the engine is in operation there will always be a certain amount of gaseous fuel within the chamber in the manifold, and as this chamber is endless and portions thereof extend in two directions from each gaseous fuel outlet port, there will be very little, if any, fluctuation of pressure within the manifold, and, consequently, the carbureter that supplies said manifold with fuel will function to develop maximum power and fuel economy during engine operation.

Inasmuch as the bottom surfaces of both upper and lower members of the manifold decline in both directions away from the center, any condensation that may take place on the inner surfaces of the walls of the manifold will eventually flow by gravity downwardly over the drain surfaces and will pass through the outlet ports 16 to the combustion chambers within the engine.

An inlet manifold of my improved construction is comparatively simple, may be easily and cheaply produced and is very effective in performing its intended functions.

I claim as my invention:

1. A gaseous fuel inlet manifold comprising a housing having upper and lower chambers, one of which is arranged directly above the other, the ends of which are connected by short vertically disposed curved ducts, the upper chamber being substantially larger in area than the lower chamber, the connected ends of the two chambers being provided with outlet openings, the intermediate portion of the lower chamber being provided with an inlet opening and the bottom surfaces of both chambers being formed so as to provide gravity drainage from their intermediate portions toward both of said outlet openings.

2. A gaseous fuel inlet manifold having upper and lower chambers, one of which is arranged directly above the other, the upper chamber being substantially larger than the lower chamber, the ends of said chambers having communication with each other by means of short vertically disposed curved ducts, the bottom surface of the upper chamber being formed so that it gradually declines from a central point toward both ends, the ends of the lower chamber being provided with outlet openings, the central portion of said lower chamber being provided with an inlet opening and the bottom surface of which lower chamber gradually declines from the centrally arranged inlet opening toward said outlet openings.

In testimony whereof I affix my signature.

EVERETT R. BURTNETT.